United States Patent
Yu et al.

(10) Patent No.: US 11,963,207 B2
(45) Date of Patent: Apr. 16, 2024

(54) METHOD AND APPARATUS FOR SIDELINK COMMUNICATION

(71) Applicant: LENOVO (BEIJING) LIMITED, Beijing (CN)

(72) Inventors: Xiaodong Yu, Beijing (CN); Haipeng Lei, Beijing (CN); Zhennian Sun, Beijing (CN); Lianhai Wu, Beijing (CN); Jing Han, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 395 days.

(21) Appl. No.: 17/276,128

(22) PCT Filed: Sep. 26, 2018

(86) PCT No.: PCT/CN2018/107722
§ 371 (c)(1),
(2) Date: Mar. 13, 2021

(87) PCT Pub. No.: WO2020/061846
PCT Pub. Date: Apr. 2, 2020

(65) Prior Publication Data
US 2022/0053496 A1    Feb. 17, 2022

(51) Int. Cl.
*H04W 72/53*    (2023.01)
*H04L 1/1607*    (2023.01)
*H04L 5/00*    (2006.01)
*H04W 72/20*    (2023.01)
*H04W 72/543*    (2023.01)

(52) U.S. Cl.
CPC .......... *H04W 72/53* (2023.01); *H04L 1/1664* (2013.01); *H04L 5/0053* (2013.01); *H04W 72/20* (2023.01); *H04W 72/543* (2023.01)

(58) Field of Classification Search
CPC ... H04W 72/53; H04W 72/20; H04W 72/543; H04W 88/04; H04W 28/26; H04W 76/14;
(Continued)

(56) References Cited

U.S. PATENT DOCUMENTS

2016/0066337 A1    3/2016   Sartori et al.
2016/0301539 A1*  10/2016   Lindoff .................. H04W 4/06
(Continued)

FOREIGN PATENT DOCUMENTS

CN    105813204 A    7/2016
CN    106717091 A    5/2017
(Continued)

OTHER PUBLICATIONS

Intel Corporation, Downlink multiplexing of eMBB/URLLC transmissions, 3GPP TSG RAN1 WG Meeting #88, R1-1702240, Feb. 13-17, 2017, pp. 1-7, Athens, Greece.
(Continued)

*Primary Examiner* — Thai Nguyen
(74) *Attorney, Agent, or Firm* — Kunzler Bean & Adamson

(57) ABSTRACT

Methods and apparatus for sidelink communication are disclosed. One method of a Tx/Rx UE comprises reserving resources for one or more sidelink (SL) data transmissions and resources for decoding result feedbacks corresponding to the one or more SL data transmissions; transmitting sidelink control information (SCI) to a second apparatus, which indicates the resources for the SL data transmissions; and receiving at least one of the decoding result feedback and a pre-emption indicator. Another method of a Tx/Rx UE comprises receiving SCI, which indicates resources for the SL data transmissions, from a first apparatus; and transmitting at least one of the decoding result feedback and a pre-emption indicator.

20 Claims, 14 Drawing Sheets

(58) Field of Classification Search
CPC .... H04W 72/56; H04L 1/1664; H04L 5/0053; H04L 1/1861; H04L 1/1822; H04L 1/0025; H04L 1/1896; H04L 5/0044; H04L 5/0055
See application file for complete search history.

(56) References Cited

U.S. PATENT DOCUMENTS

| | | | |
|---|---|---|---|
| 2017/0347394 A1 | 11/2017 | Yasukawa et al. | |
| 2020/0029340 A1* | 1/2020 | He | H04W 76/14 |

FOREIGN PATENT DOCUMENTS

| | | | |
|---|---|---|---|
| CN | 106793092 A | 5/2017 | |
| WO | 2018055813 A1 | 3/2018 | |
| WO | WO-2020033088 A1 * | 2/2020 | H04B 17/318 |
| WO | WO-2020068991 A1 * | 4/2020 | H04W 4/40 |

OTHER PUBLICATIONS

Intel Corporation, Support of Sidelink Unicast, Groupcast and Broadcast Modes for NR V2X Communication, 3GPP TSG RAN WG1 Meeting #94, R1-1808693, Aug. 20-24, 2018, pp. 1-7, Gothenburg, Sweden.

3GPP, 3rd Generation Partnership Project; Technical Specification Group Radio Access Network; Feedback Information for sidelink link adaptation, 3GPP R1-1712136, Aug. 2017, pp. 1-2.

International Searching Authority, "Notification of Transmittal of the International Search Report and the Written Opinion of the International Searching Authority, or the Declaration", PCT/CN2018/107722, dated Sep. 26, 2018, pp. 1-6.

* cited by examiner

METHOD AND APPARATUS FOR SIDELINK COMMUNICATION

FIELD

The subject matter disclosed herein relates generally to wireless communication and more particularly relates to sidelink (SL) communication.

BACKGROUND

The following abbreviations and acronyms are herewith defined, at least some of which are referred to in the following description.

Third Generation Partnership Project ("3GPP"), Positive-Acknowledgment ("ACK"), Channel State Information ("CSI"), Control Channel ("CCH"), Device-to-Device ("D2D"), further enhancement Device-to-Device ("feD2D"), Downlink Control Information ("DCI"), Downlink ("DL"), Demodulation Reference Signal ("DMRS"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Multiple Access ("MA"), Machine Type Communication ("MTC"), Narrowband ("NB"), Negative-Acknowledgment ("NACK") or ("NAK"), Orthogonal Frequency Division Multiplexing ("OFDM"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Quality of Service ("QoS"), Radio Network Temporary ("RNTI"), Identity Radio Resource Control ("RRC"), Reference Signal Receiving Power ("RSRP"), Reference Signal Strength Indicator ("RSSI"), Receive ("RX"), Scheduling Assignment ("SA"), Scheduling Request ("SR"), Shared Channel ("SCH"), Sidelink Control Information ("SCI"), System Information Block ("SIB"), Sidelink ("SL"), Semi-Persistent Scheduling ("SPS"), Sounding Reference Signal ("SRS"), Transport Block ("TB"), Transport Block Size ("TBS"), Transmission Control Protocol ("TCP"), Time Division Duplex ("TDD"), Time-Division Multiplexing ("TDM"), Transmission Time Interval ("TTP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Next Generation ("NR"), Radio Access Network ("RAN"), Vehicle-to-Vehicle ("V2V") and Vehicle-to-Everything ("V2X"). As used herein, SL communication is also known as D2D communication.

Both D2D and V2V communication are broadcast-based communication currently. However, broadcast-based communication does not meet the requirements for resource utilization efficiency, throughput, QoS, reliability, complexity and power consumption. Therefore, a new study on improvement of resource utilization efficiency has been developed, which proposes to support physical layer HARQ feedback procedure, feedback resource allocation and pre-emption of reserved resources on sidelink.

BRIEF SUMMARY

Both 3GPP Rel-12/Rel-13 D2D communication and 3GPP Rel-14 V2V communication are typical broadcast-based communications, wherein one of the main objectives is to enable as many receivers as possible to successfully decode the messages. Mechanisms such as blind (re)transmission without feedback are no longer suitable for unicast communication. Enhancements to SL communication should be studied to support physical layer HARQ feedback procedure, feedback resource allocation and pre-emption of reserved resources in order to meet the requirements for resource utilization efficiency, throughput, QoS, reliability, complexity and power consumption.

Enhancements to improve resource utilization efficiency require effective mechanisms to utilize the reserved resources, which will not be used however, in order to avoid wasting on the resources. There is thus a need to develop a new mechanism for pre-emption of the reserved but unused resources.

In unicast-based SL communication, it is beneficial to feedback for decoding result feedback corresponding to SL data transmission; thereby the mechanism for the transmission of the decoding result feedback should also be studied.

Methods and apparatus for resource pre-emption in SL communication are disclosed. One method of a Tx UE comprises reserving resources for one or more SL data transmissions and resources for decoding result feedbacks corresponding to the one or more SL data transmissions; and transmitting sidelink control information (SCI) to a second apparatus, which indicates the resources for the SL data transmissions.

In one aspect, the SCI indicates the resources for current SL data transmission and the resources for next SL data transmission. In another aspect, the SCI indicates the resources for the one or more SL data transmissions.

The method further comprises: receiving a pre-emption indicator in the resources for the decoding result feedback, which indicates the second apparatus will pre-empt the reserved resources for the SL data transmission, in the case that the decoding result feedback is a positive feedback.

Another method of a Rx UE comprises receiving SCI, which indicates resources for the SL data transmissions from a first apparatus; and transmitting at least one of the decoding result feedback and a pre-emption indicator.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1A:
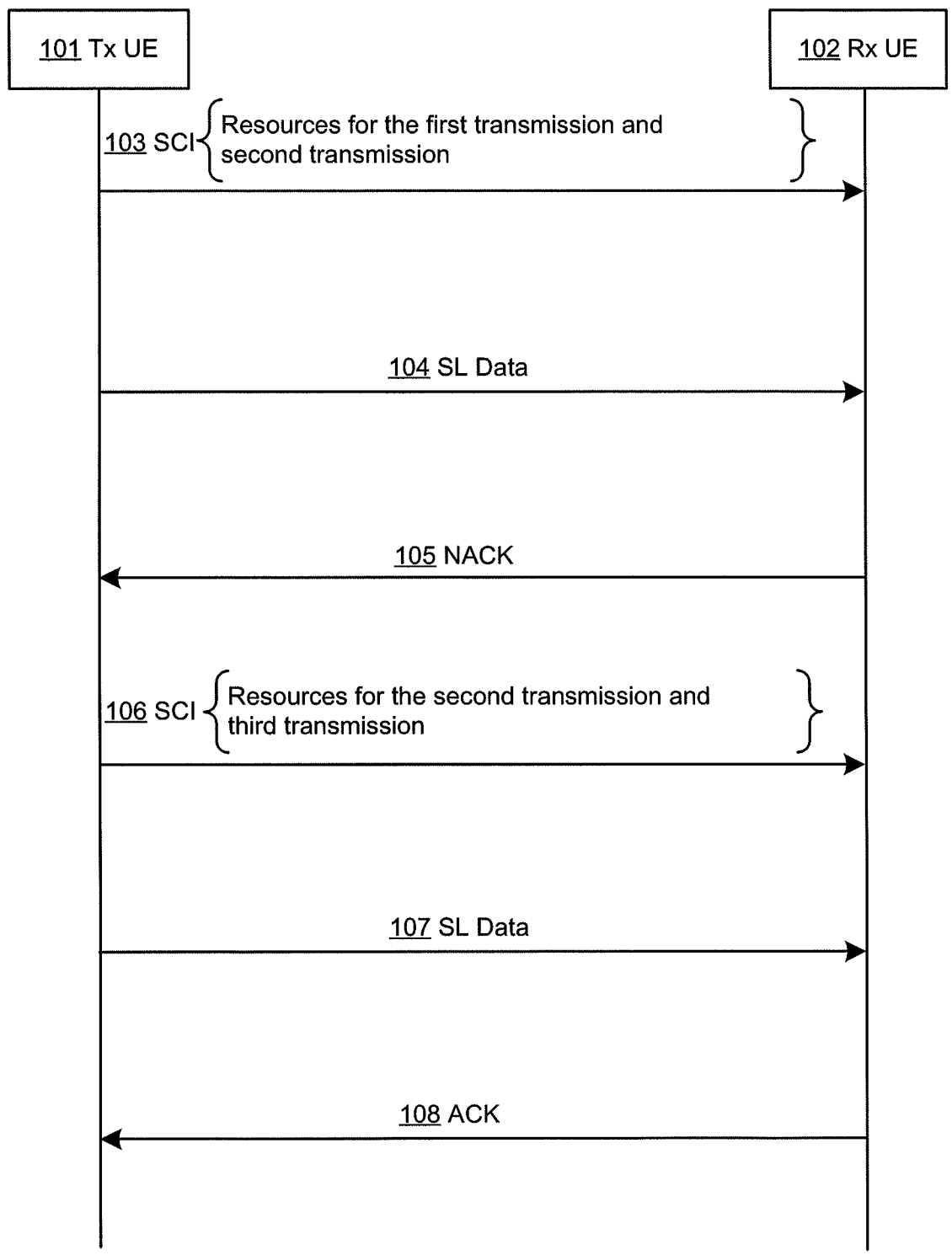
FIG. 1A is a call flow illustrating data transmission between a Tx UE and a Rx UE in the case that SCI indicates the resources for current SL data transmission and the resources for next SL data transmission according to a first embodiment.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.), or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer-readable storage devices storing machine readable code, computer-readable code, and/or program code, collectively referred to hereafter as "code". The storage devices may be tangible, non-transitory, and/or non-transmission. The storage devices may not embody signals. In a certain embodiment, the storage devices only employ signals for accessing code.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, random-access memory ("RAM"), read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Reference throughout this specification to "one embodiment", "an embodiment", or similar language, means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data-processing apparatus—create a means for implementing the functions/acts specified in the schematic flowchart diagrams and/or schematic block diagrams.

The code may also be stored in a storage device that can direct a computer, other programmable data-processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data-processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, from the illustrated Figures.

The description of elements in each figure may refer to elements of proceeding figures. Like numbers refer to like elements in all figures, including alternate embodiments of like elements.

Enhancements to SL should be studied to support physical layer HARQ feedback procedure, feedback resource allocation and pre-emption of reserved resources on sidelink in order to meet the requirements for resource utilization efficiency, throughput, QoS, reliability, complexity and power consumption. Disclosed herein are methods and apparatus that provide a mechanism of pre-emption of the reserved resources in SL communication. The Tx or Rx UE may either be a relay UE or a remote UE depending on the context. From the perspectives of both Tx UE and Rx UE, it is crucial to reserve resources for feedbacks corresponding to the one or more SL data transmissions at the beginning of the communication between the Rx UE and Tx UE. Exemplary schemes for indication of SL data transmission, exemplary ways for learning the reserved resources for the feedback, exemplary ways for pre-empting the reserved resources and the exemplary ways for receiving the feedback are to be described in details below with respect to FIG. 1A to FIG. 9.

FIG. 1A is a call flow illustrating data transmission between a Tx UE and a Rx UE in the case that the SCI indicates the resources for current SL data transmission and the resources for next SL data transmission according to a first embodiment. As shown in FIG. 1A, SL communication between Tx UE 101 and Rx UE 102 begins at step 103, in which initial SCI is transmitted from the Tx UE 101 to the Rx UE 102. Particularly, the SCI in step 103 indicates resources for initial transmission and retransmission of one transport block (TB), i.e. the first and second transmission of SL data. Multiple SL data transmissions may be for same transport block or different transport blocks. In one embodiment, the resources for SL data transmissions are included in sets of SL resources, for example—the number of which is set to be 2, i.e., for current (the first) transmission and subsequent (the second) retransmission. Besides the resources for SL data transmissions, the sets of SL resources may include resources for decoding result feedback corresponding to the SL data transmissions and resources for SCI transmissions.

Simultaneously or sequentially, in step 104, SL data is transmitted from the Tx UE 101 to the Rx UE 102 over the first reserved resources for SL data transmission.

In response to receiving both the SCI and the SL data, the Rx UE 102 attempts to decode the received data. In the case that the data is decoded unsuccessfully, the Rx UE 102 transmits a negative feedback of NACK to the Tx UE 101 on the resources for decoding result feedback, which may be indicated in the SCI from the Tx UE 101 or derived from at least one of the resources for SL data transmissions and the resources for SCI transmissions, in step 105.

In response to receiving the NACK in step 105, the Tx UE 101 transmits the second SCI over the reserved resources for the SCI transmission in step 106, and SL data over the second reserved resource for SL data transmissions in step 107. Further, the SCI in step 106 indicates resources for the second and the third transmissions of SL data, which is similar with the SCI in step 103.

In FIG. 1A, the decoding result feedback corresponding to the SL data in step 107 is a positive feedback of ACK, shown as in step 108. Although it is not shown in FIG. 1A, it should be understood that in the case where the decoding result feedback in step 108 is still a negative feedback of NACK, the Tx UE 101 will transmit the SL data again until a maximum number of transmission is reached.

In some embodiments, an exemplary format for SCI may include one or more fields as below: QoS level of SL data transmission, including at least one of a priority of SL data transmission, a latency requirement of SL data transmission, a reliability requirement of SL data transmission, frequency and/or time resource location of initial transmission and retransmission, time offset between initial transmission and retransmission of SL data, modulation and coding scheme (MCS), transmission format indicating whether rate-matching and TBs scaling are applied, retransmission index indicating whether the transmission of SL data corresponding to the SCI is retransmission or initial transmission, frequency and/or time resource location of reserved SL data transmission resource, time offset between current SL data transmission and reserved resource for the next SL data transmission, frequency and/or time resource location of feedback transmission, reservation indication of SL data transmission, HARQ process number, destination identifier (ID), source identifier (ID), session identifier (ID).

Figure 1B:
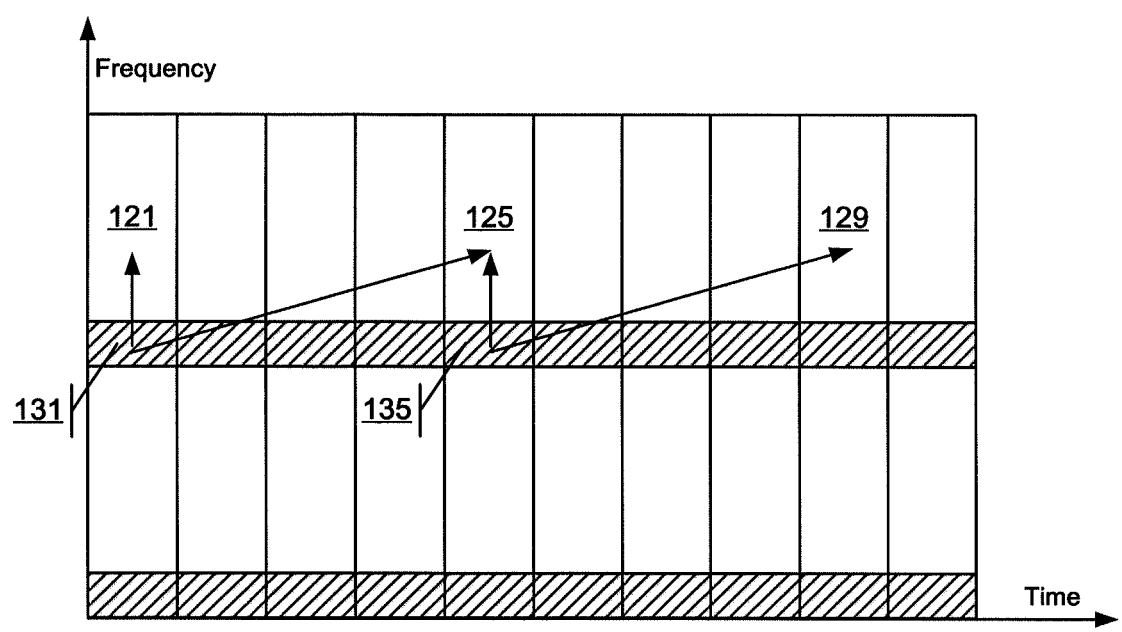
FIG. 1B is a schematic diagram illustrating resource allocation and reservation indication in the case that the SCI indicates the resources for current SL data transmission and the resources for next SL data transmission according to the first embodiment.

FIG. 1B is a schematic diagram illustrating resource allocation and reservation indication in the case that the SCI indicates the resources for current SL data transmission and the resources for next SL data transmission according to the first embodiment. As shown in FIG. 1B, the shaded blocks represent resources for SCIs, while the blank blocks represent resources for SL data. The resources for decoding result feedback corresponding to the SL data are not explicitly shown in FIG. 1B, however, they can be associated with the resources for SCI. For example, the resources for decoding result feedback may have fixed time offset to that for the SCI indicating the corresponding SL data transmission, the time offset may be depended on UE process time or pre-configured by gNB or pre-defined (e.g., 4 ms), and have the same subcarriers with SCI in frequency domain. Alternatively, the resources for decoding result feedback may be in a new independent channel other than the legacy PSSCH or PSCCH.

FIG. 1B is shown in combination with FIG. 1A, the resource for the SCI in step 103 is represented by the shaded block 131, and the resource for the SCI in step 106 is represented by the shaded block 135. As shown in FIG. 1B, the SCI (in step 103 of FIG. 1A) carried in the shaded block 131 indicates the resources for initial (first) transmission and retransmission (second) of SL data, which are represented by the blank block 121 and 125, respectively. Similarly, the SCI (in step 106 of FIG. 1A) carried in the shaded block 135 indicates the resources for current (second) and next (third) transmission of SL data, which are represented by the blank block 125 and 129, respectively. Namely, the resource for the SL data transmission in step 104 is represented by the blank block 121, the resource for the SL data transmission in step 107 is represented by the blank block 125. As shown in FIGS. 1A and 1B, each SCI indicates the resources for current SL data transmission and the resources for next SL data transmission.

Figure 2A:
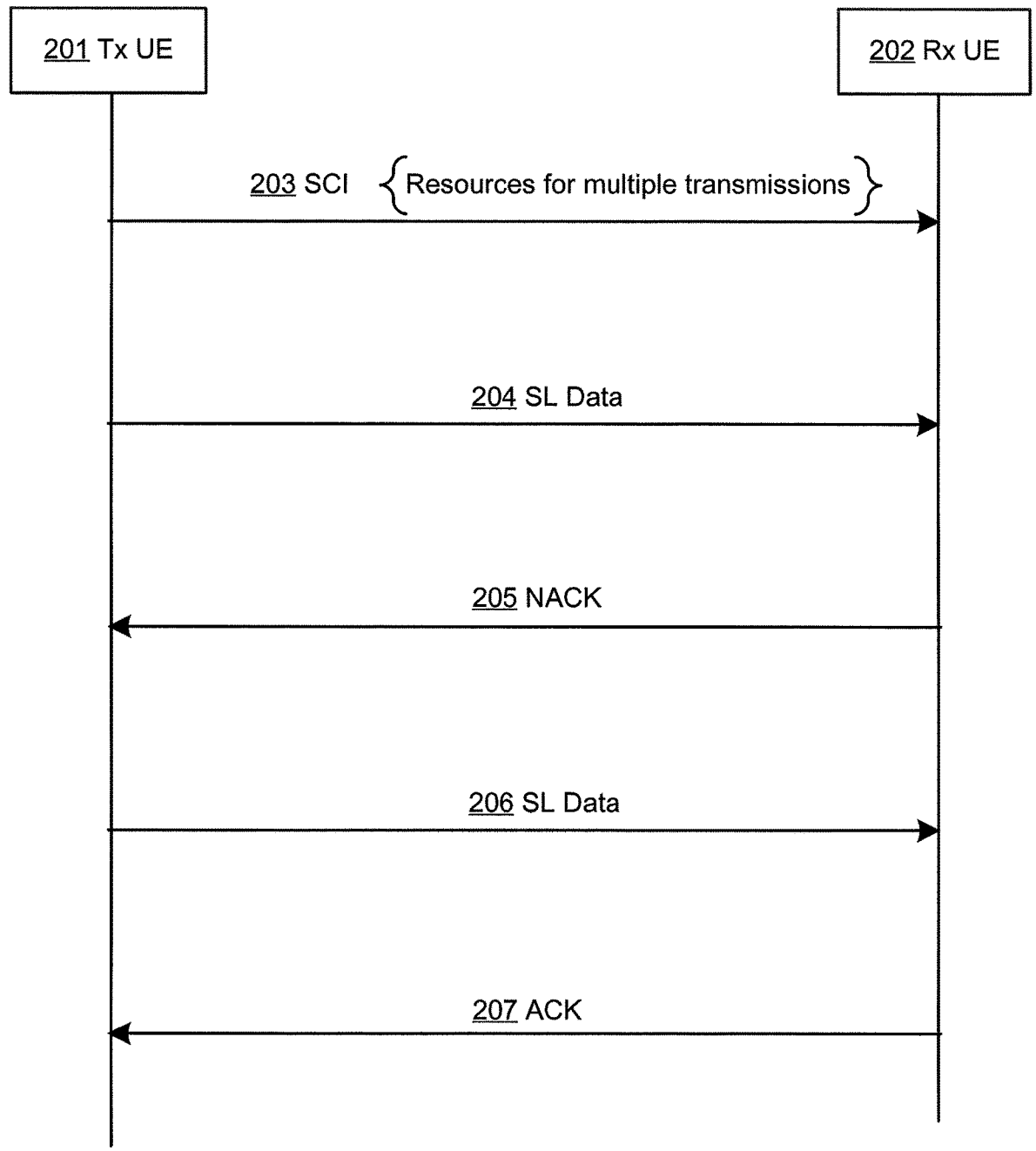
FIG. 2A is a call flow illustrating data transmission between a Tx UE and a Rx UE in the case that the SCI indicates the resources for the one or more SL data transmissions according to a second embodiment.

FIG. 2A is a call flow illustrating data transmission between a Tx UE and a Rx UE in the case that the SCI indicates the resources for the one or more SL data transmissions according to a second embodiment. As shown in FIG. 2A, SL communication between a Tx UE 201 and a Rx UE 202 begins at step 203, in which SCI is transmitted from the Tx UE 201 to the Rx UE 202. Particularly, the SCI indicates resource for one or more transmission of SL data. The difference between the SCI in the first and second embodiment is in that, the SCI in the second embodiment indicates all of the reserved resources for SL data transmissions. In this case, the sequential SCIs shown in FIG. 1A are not needed.

Simultaneously or sequentially, SL data 204 is transmitted from the Tx UE 201 to the Rx UE 202 over the first reserved resource for SL data transmission.

In response to receiving both the SCI 203 and the SL data 204, the Rx UE 202 attempts to decode the received data. In the case that the data is decoded unsuccessfully, the Rx UE 202 transmits a negative feedback of NACK to the Tx UE 201 on the resources for decoding result feedback, which may be indicated in the SCI from the Tx UE 101 or derived from at least one of the resources for SL data transmissions and the resources for SCI transmissions, in step 205.

In response to receiving the NACK in step 205, the Tx UE 201 transmits SL data over the second reserved resource for SL data transmissions in step 206. As mentioned above, the resources for SL data transmission in step 206 are already indicated by the SCI in step 203.

In FIG. 2A, the decoding result feedback corresponding to the SL data in step 206 is a positive feedback of ACK, shown as in step 207. Although it is not shown in FIG. 2A, it should be understood that in the case where the decoding result feedback in step 207 is still a negative feedback of NACK, the Tx UE 101 will transmit the SL data again until a maximum number of transmission is reached.

In some embodiments, an exemplary format for SCI includes one or more fields as below: priority of SL data transmission, frequency resource location of initial transmission and retransmission, time offset between successive SL data transmission, a maximum number of the SL data transmissions, modulation and coding scheme (MCS), transmission format indicating whether rate-matching and TBs scaling are applied, retransmission index indicating whether the transmission of SL data corresponding to the SCI is retransmission or initial transmission.

Figure 2B:
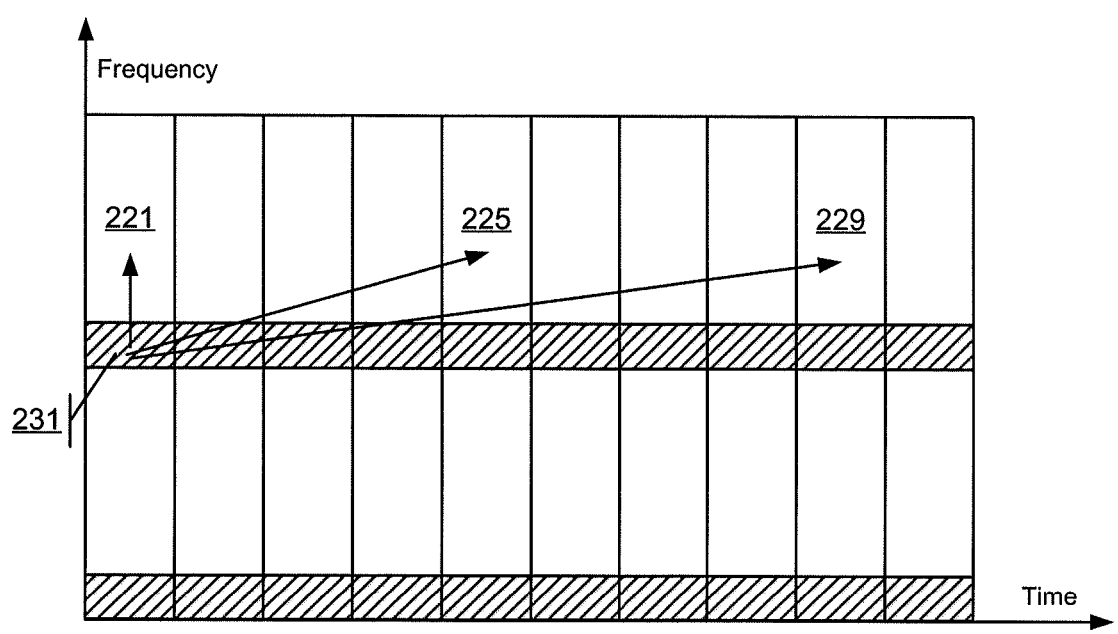
FIG. 2B is a schematic diagram illustrating resource allocation and reservation indication in the case that the SCI indicates the resources for the one or more SL data transmissions according to the second embodiment.

FIG. 2B is a schematic diagram illustrating resource allocation and reservation indication in the case that the SCI indicates the resources for the one or more SL data transmissions according to the second embodiment. As shown in FIG. 2B, the shaded blocks represent resources for SCI, while the blank blocks represent resources for SL data. The resources for decoding result feedback corresponding to the SL data are not explicitly shown in FIG. 2B, however, they can be associated with the resources for SCI and SL data. For example, the resources for decoding result feedback may have fixed time offset to that for the SL data in time domain, the time offset may be depended on UE process time or pre-configured by gNB or pre-defined (e.g., 4 ms), and have the same subcarriers with SCI in frequency domain. Alternatively, the resources for decoding result feedback may be in a new independent channel other than the legacy PSSCH or PSCCH. FIG. 2B is shown in combination with the FIG. 2A, the resource for the SCI 203 is represented by the shaded block 231. As shown in FIG. 2B, the SCI (in step 203 of FIG. 2A) carried in the shaded block 231 indicates the resources for one or more transmission of SL data, which are represented by the blank block 221, 225 and 229, assuming the number of one or more SL data transmissions is set to be three. Namely, the resource for the SL data transmission in step 204 is represented by the blank block 221, the resource for the SL data transmission in step 206 is represented by the blank block 225. As shown in FIGS. 2A and 2B, the SCI indicates the resources for the one or more SL data transmissions.

Figure 3:
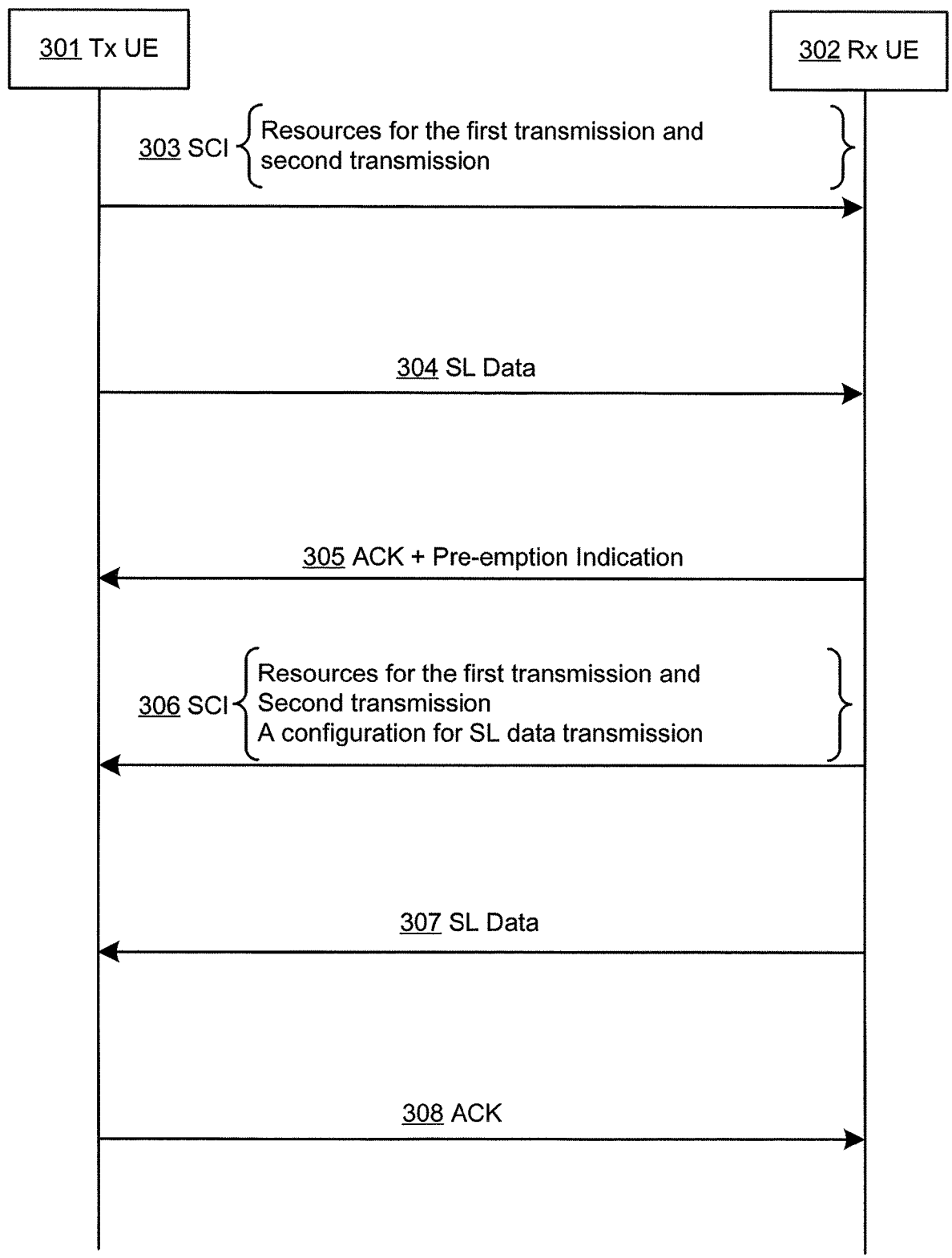
FIG. 3 is a call flow illustrating data transmission between a Tx UE and a Rx UE in the case that Rx UE pre-empts the resource reserved by the Tx UE under the context of FIG. 1A according to a third embodiment.

FIG. 3 is a call flow illustrating data transmission between a Tx UE and a Rx UE in the case that Rx UE pre-empts the resource reserved by the Tx UE under the context of FIG. 1A according to a third embodiment.

As shown in FIG. 3, SL communication between Tx UE 301 and Rx UE 302 begins at step 303, in which initial SCI is transmitted from the Tx UE 301 to the Rx UE 302. The steps 303 and 304 are similar with steps 103 and 104, therefore the description thereof are omitted for the purpose of brevity.

In response to receiving both the SCI and the SL data, the Rx UE 302 attempts to decode the received data. In the case that the data is decoded successfully, the Rx UE 302 transmits a positive feedback of ACK and a pre-emption indication to the Tx UE 301 in step 305, which indicates the Rx UE 302 is going to pre-empt the reserved resources by the Tx UE 301 considering the SL data from Tx UE 301 has been successfully received and decoded. In a preferred embodiment, the pre-emption indication is transmitted along with the positive feedback, however, the present disclosure is not limited to so.

Further, the pre-emption indicator may be transmitted in the reserved resources for the decoding result feedback. In the case that the decoding result feedback is included in the SCI from the Rx UE 302 as a field, a field for the pre-emption indicator is also included in the same SCI.

In another embodiment, a field for a flag, which indicates that a field for the decoding result feedback indicates the pre-emption indicator, is included in SCI from the Rx UE 302. For example, if the flag is set to be 1, the field for the decoding result feedback is re-used for the pre-emption indicator, which implies that the decoding result feedback is a positive feedback and the Rx UE is going to pre-empt the reserved resource by the Tx UE. On the contrary, if the flag is set to be 0, the field for the decoding result feedback still indicates the decoding result feedback corresponding to the SL data transmission for the Tx UE 301.

In yet another embodiment, the pre-emption indicator is piggybacked in the resources for the decoding result feedback. In the case that the decoding result feedback is included in the SCI from the Rx UE 302, thereby carried in PSCCH, the pre-emption indicator is piggybacked in PSCCH, but not included in the SCI as a field.

Optionally, the Rx UE 302 transmits another SCI over the reserved resources for the SCI transmission by the Tx UE 301 in step 306, and SL data over the reserved resource for SL data transmissions by the Tx UE 301 in step 307. Further, besides the resources for SL data transmission from the Rx UE—which is same with the reserved resources for SL data transmission by the Tx UE and indicated by the SCI in step 303, the SCI 306 may indicate a configuration for the SL data transmission from the Rx UE 302, including but not limited to: QoS level of SL data transmission, including at least one of a priority of SL data transmission, a latency requirement of SL data transmission, a reliability requirement of SL data transmission, frequency and/or time resource location of initial transmission and retransmission, modulation and coding scheme (MCS), transmission format indicating whether rate-matching and TBs scaling are applied, frequency and/or time resource location of feedback transmission, HARQ process number, destination identifier (ID), source identifier (ID), session identifier (ID).

In response to receiving the SCI and SL data from the Rx UE 302, in step 308, the Tx UE 301 transmits a positive/negative feedback of ACK/NACK, indicating a successful/unsuccessful decoding on the SL data from the Rx UE 302.

Figure 4:
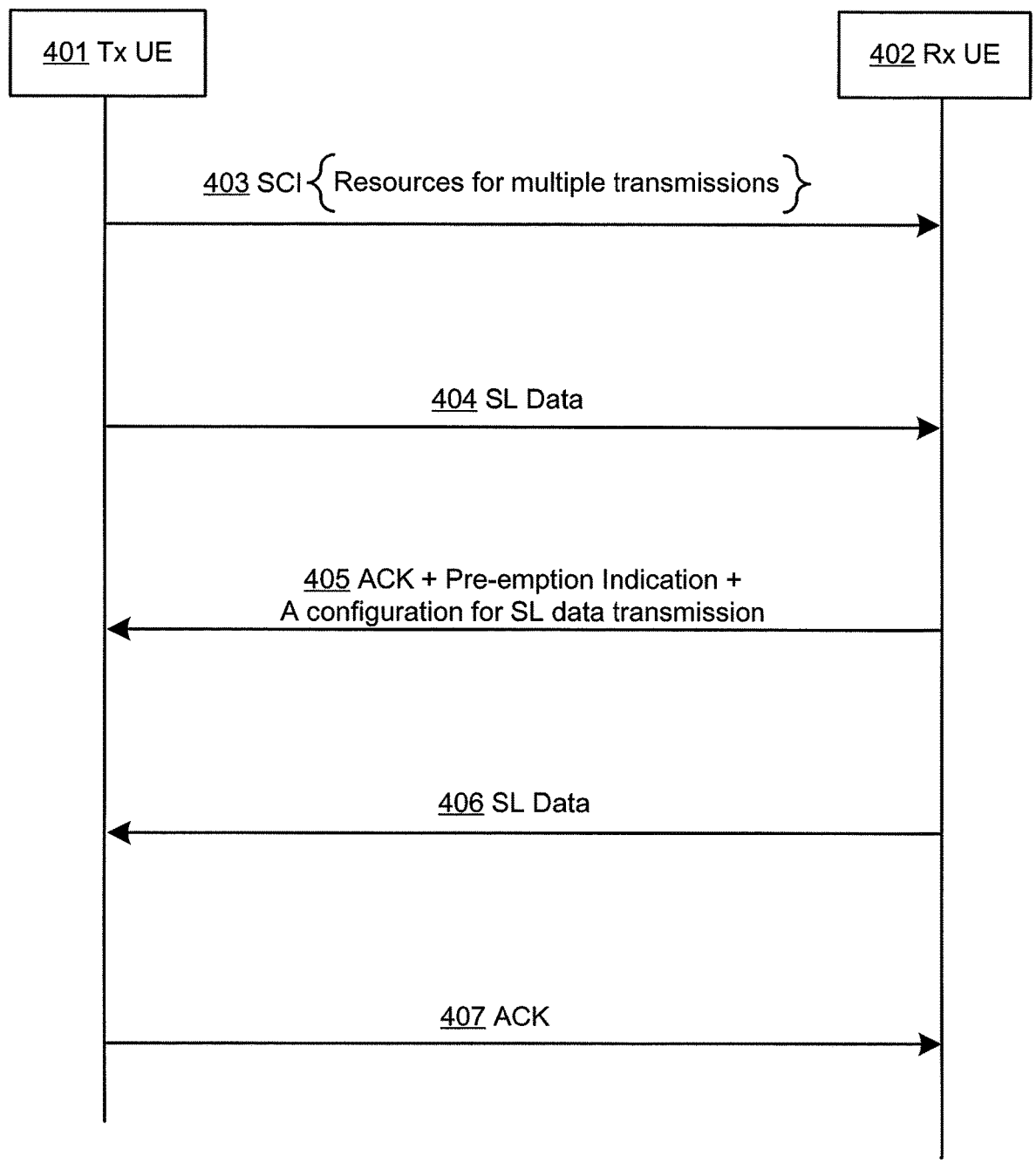
FIG. 4 is a call flow illustrating data transmission between a Tx UE and a Rx UE in the case that Rx UE pre-empts the resource reserved by the Tx UE under the context of FIG. 2A according to a fourth embodiment.

FIG. 4 is a call flow illustrating data transmission between Tx UE and Rx UE in the case that Rx UE pre-empts the resource reserved by Tx UE under the context of FIG. 2A according to a fourth embodiment.

As shown in FIG. 4, SL communication between a Tx UE 401 and a Rx UE 402 begins at step 303, in which SCI 403 is transmitted from the Tx UE 401 to the Rx UE 402. The steps 403 and 404 are similar with steps 203 and 204, therefore the description thereof are omitted for the purpose of brevity.

In response to receiving both the SCI and the SL data, the Rx UE 302 attempts to decode the received data. In the case that the data is decoded successfully, the Rx UE transmits a positive feedback of ACK, a pre-emption indication and optionally, and/or a configuration for SL data transmission from the Rx UE 302, in step 405. The transmission of the pre-emption indicator indicates the Rx UE 402 is going to pre-empt the reserved resources by the Tx UE 301, considering the SL data from Tx UE 301 has been successfully received and decoded. In a preferred embodiment, the pre-emption indication is transmitted along with the positive feedback, however, the present disclosure is not limited to so. As mentioned above, the configuration for the SL data transmission from the Rx UE 302 includes but not limited to: QoS level of SL data transmission, including at least one of a priority of SL data transmission, a latency requirement of SL data transmission, a reliability requirement of SL data transmission, frequency and/or time resource location of initial transmission and retransmission, modulation and coding scheme (MCS), transmission format indicating whether rate-matching and TBs scaling are applied, frequency and/or time resource location of feedback transmission, HARQ process number, destination identifier (ID), source identifier (ID), session identifier (ID).

Similar with transmission of the pre-emption indication in the third embodiment, the pre-emption indicator may be transmitted in the reserved resources for the decoding result feedback. In the case that the decoding result feedback is included in the SCI from the Rx UE 402 as a field, a field for the pre-emption indicator is also included in the same SCI.

In another embodiment, a field for a flag, which indicates that a field for the decoding result feedback indicates the pre-emption indicator, is included in SCI from the Rx UE 402. For example, if the flag is set to be 1, the field for the decoding result feedback is re-used for the pre-emption indicator, which implies that the decoding result feedback is a positive feedback and the Rx UE is going to pre-empt the reserved resource by the Tx UE. On the contrary, if the flag is set to be 0, the field for the decoding result feedback still indicates the decoding result feedback corresponding to the SL data transmission for the Tx UE 401.

In yet another embodiment, the pre-emption indicator is piggybacked in the resources for the decoding result feedback. In the case that the decoding result feedback is included in the SCI from the Rx UE 401, thereby carried in PSCCH, the pre-emption indicator is piggybacked in PSCCH, but not included in the SCI as a field.

Then in step 406, the Rx UE 402 transmits SL data over the reserved resources for the SL data transmission by the Tx UE 401, which is indicated by the SCI in step 403.

In response to receiving the SL data from the Rx UE 406, in step 407, the Tx UE 401 transmits a positive/negative feedback of ACK/NACK, indicating a successful/unsuccessful decoding on the SL data from the Rx UE 402.

Figure 5:
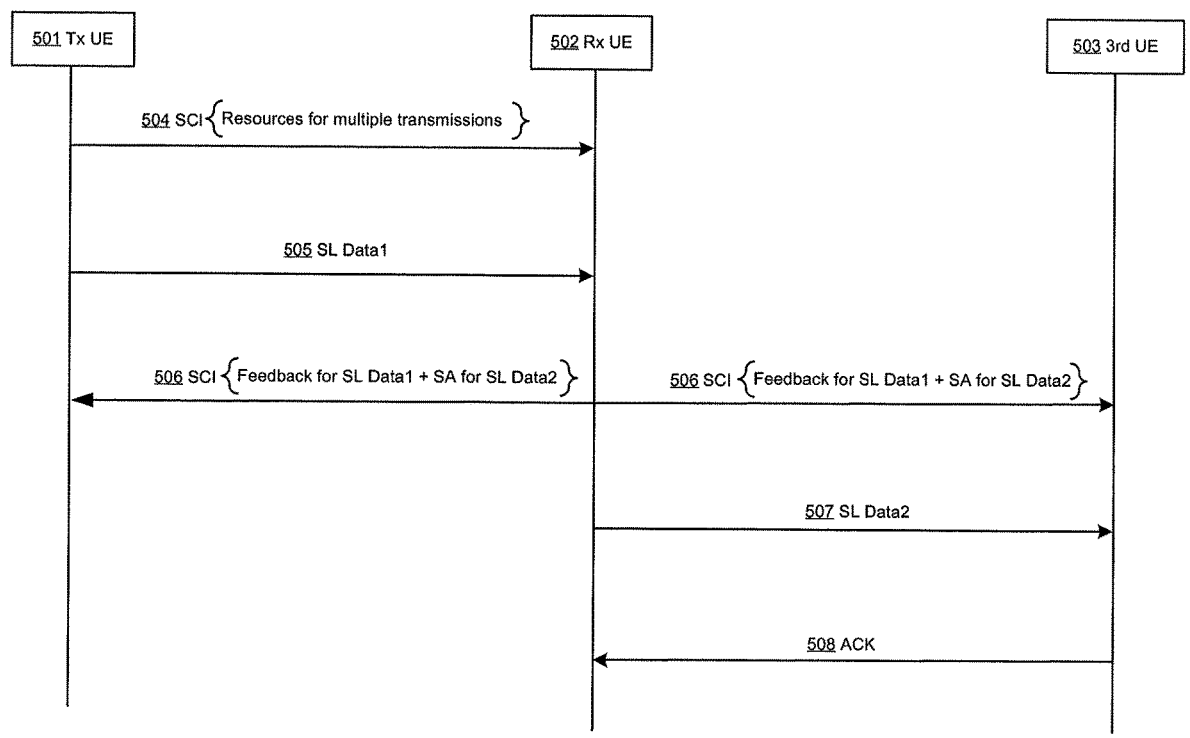
FIG. 5 is a call flow illustrating a mechanism of a Tx UE receiving a feedback from Rx UE according to a fifth embodiment.

FIG. 5 is a call flow illustrating a mechanism of a Tx UE receiving a decoding result feedback from a Rx UE according to a fifth embodiment. As shown in FIG. 5, a Tx UE 501, a Rx UE 502 and a third UE 503 are involved. The SL communication between Tx UE 501 and Rx UE 502 begins at step 504, in which SCI is transmitted from the Tx UE 501 to the Rx UE 502. The SCI in step 504 indicates the resources for current SL data transmission and the resources for next SL data transmission as mentioned in the first embodiment, or resources for one or more SL data transmission in the second embodiment. Simultaneously or sequentially, SL data is transmitted from the Tx UE 501 to the Rx UE 502 over the reserved resource for SL data in step 505.

In step 506, the Rx UE 502 includes a field for the decoding result feedback corresponding to the SL data transmission in step 505, in SCI directed to the third UE 503. Fields other than the field for the decoding result feedback in the SCI from Tx UE 502 indicates a scheduling assignment (SA) for SL data transmission from Rx UE 502 to a third UE 503. In response to receiving the SCI from the Rx UE 502, the Tx UE 501 detects that the SCI is not directed to itself according to the destination identifier (ID) of the received SCI, and therefore focuses on the field for decoding result feedback to retrieve the result for the SL data transmission in step 505. In another aspect, in response to receiving the SCI from the Rx UE 502, the third UE 503 detects that the SCI is directed to itself according to the destination ID thereof, and therefore retrieve the SA for the SL data transmission from the Rx UE 502. Although the third UE 503 is shown differently from the Tx UE 501, it should be understood by the one skilled in the relevant art that the third UE 503 can be a same entity with the Tx UE, with the SL data from the Rx UE 502 being independent with that from Tx UE 501.

In step 507, the Rx UE transmits SL data to the third UE according to the SA mentioned above. In step 508, in response to successfully/unsuccessfully decoding the SL data, the third UE transmits a positive/negative feedback of ACK/NACK.

Figure 6:
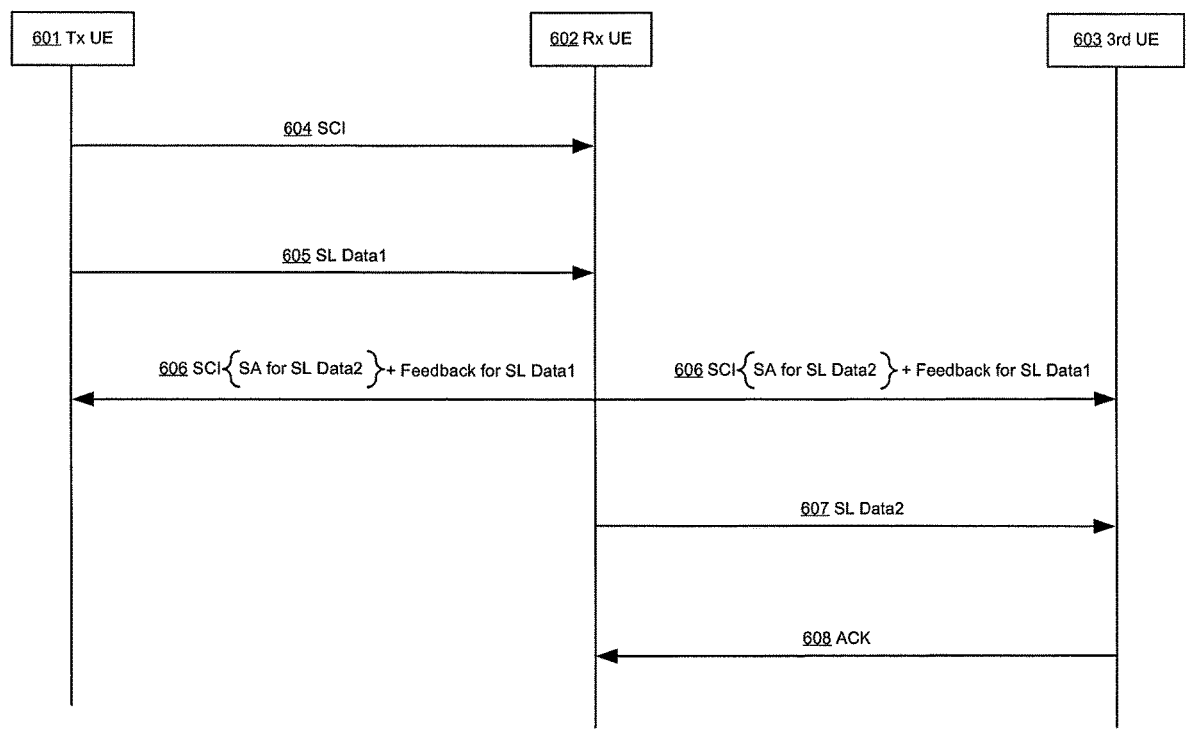
FIG. 6 is a call flow illustrating another mechanism of a Tx UE receiving a feedback from Rx UE according to a sixth embodiment.

FIG. 6 is a call flow illustrating another mechanism of a Tx UE receiving a decoding result feedback from a Rx UE according to the sixth embodiment. As shown in FIG. 6, a Tx UE 601, a Rx UE 602 and a third UE 603 are involved. The steps 604, 605, 607 and 608 are similar with the steps 604, 605, 607 and 608, respectively. Therefore, the descriptions thereof are omitted for the purpose of brevity.

In step 606, the Rx UE 602 enables the decoding result feedback corresponding to the SL data transmission in step 605 to be piggybacked in the resources for SCI transmitted from the Rx UE 602 to the third UE. In response to receiving the SCI from the Rx UE 602, the Tx UE 601 detects that the SCI is not directed to itself according to the destination identifier (ID) of the received SCI, and therefore focuses on the piggybacked part in the resources carrying the SCI, to retrieve the decoding result feedback for the SL data transmission in step 605. In another aspect, in response to receiving the SCI from the Rx UE 602, the third UE 603 detects that the SCI is directed to itself according to the destination ID thereof, and therefore retrieve the SA for the SL data transmission from the Rx UE 602. Although the third UE 603 is shown differently from the Tx UE 601, it should be understood by the one skilled in the relevant art that the third UE 603 can be a same entity with the Tx UE, with the SL data from the Rx UE 602 being independent with that from Tx UE 601.

Figure 7A:
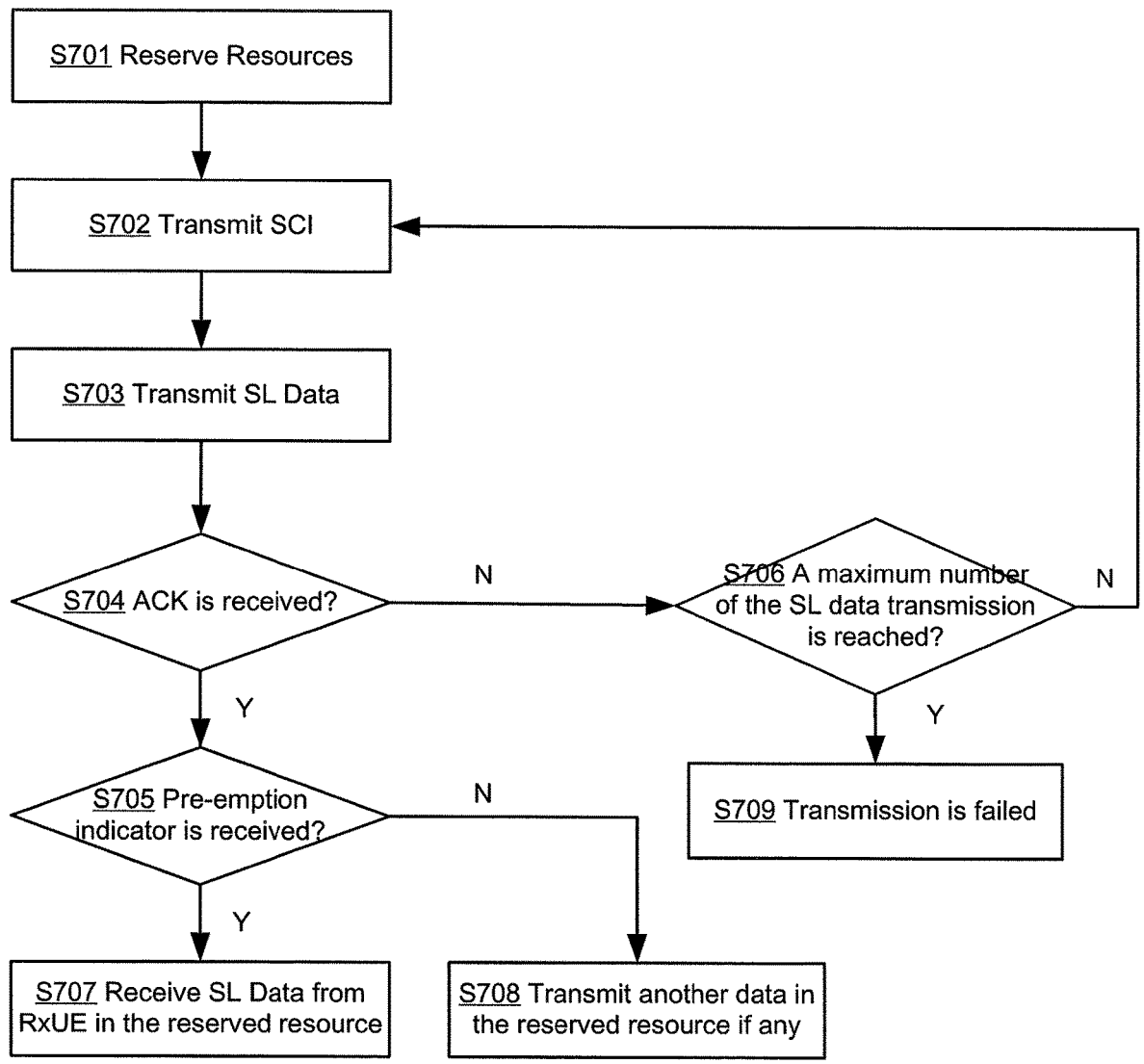
FIG. 7A is a flow diagram illustrating a method for a Tx UE under the context of FIG. 1A according to one embodiment.

FIG. 7A is a flow diagram illustrating a method for a Tx UE under the context of FIG. 1A according to one embodiment. The Rx UE is also named as the second apparatus in this embodiment.

The method begins at S701, in which the Tx UE reserves resources for one or more SL data transmissions and resources for decoding result feedbacks corresponding to the one or more SL data transmissions. In step S702, the Tx UE transmits sidelink control information (SCI) to a Rx UE, which indicates the resources for the SL data transmissions.

In some embodiments, the Tx UE reserves resources for the SCI transmission, wherein the SCI indicates the resources for current SL data transmission and the resources for next SL data transmission.

In some embodiments, the reserved resources for the decoding result feedback are derived from at least one of the resources for the SL data transmissions and resources for the SCI transmissions. Alternatively, the reserved resources for the decoding result feedback are indicated in the SCI transmitted to the second apparatus.

In step S703, the Tx UE transmits SL data to the Rx UE. In step S704, the Tx UE determine if a positive feedback of ACK is received.

If the Tx UE doesn't receive an ACK ("N" in step S704), the Tx UE determine if a maximum number of the SL data transmissions is reached. If the maximum number of the SL data transmissions has not been reached ("N" in step S706), the method proceeds back to step S702, in response to the SCI indicating the resources for current SL data transmission and the resources for next SL data transmission. If the maximum number of the SL data transmissions has been reached ("Y" in step S706), the method proceeds to S709. In step S709, the Tx UE determines that the transmission of SL data is failed. If the Tx UE receives an ACK ("Y" in step S704), the Tx UE determines if a pre-emption indicator is received in step S705.

If the Tx UE doesn't receive a pre-emption indicator ("N" in step S705), the method proceeds to S708. In step S708, optionally, the Tx UE transmits another data if any, in the reserved resources. If the Tx UE receives a pre-emption indicator ("Y" in step S705), the method proceeds to S707. In step S707, the Tx UE receives SL data from Rx UE in the reserved resource.

Preferably, the Tx UE receives a pre-emption indicator in the resources for the decoding result feedback, which indicates the second apparatus such as the Rx UE will pre-empt the reserved resources for the SL data transmission, in the case that the decoding result feedback is a positive feedback.

In one embodiment, a field for the pre-emption indicator is included in SCI from the second apparatus. In another embodiment, a field for a flag, which indicates that a field for the decoding result feedback indicates the pre-emption indicator, is included in SCI from the second apparatus. In yet another embodiment, the pre-emption indicator is piggybacked in the resources for the decoding result feedback.

Optionally, the method further includes receiving SCI from the second apparatus, which indicates a configuration for SL data transmissions from the second apparatus.

Optionally, the SCI transmitted to the second apparatus includes a pre-emption enabling indicator, which indicates whether the reserved resources for the SL data transmission are able to be pre-empted.

In some embodiments, the decoding result feedback may be received, which is piggybacked in resources for SCI transmitted from the second apparatus to another apparatus, as described in combination of FIG. 6. In other embodiments, the decoding result feedback may be received, which is included in SCI transmitted from the second apparatus to another apparatus, as described in combination of FIG. 5.

Figure 7B:
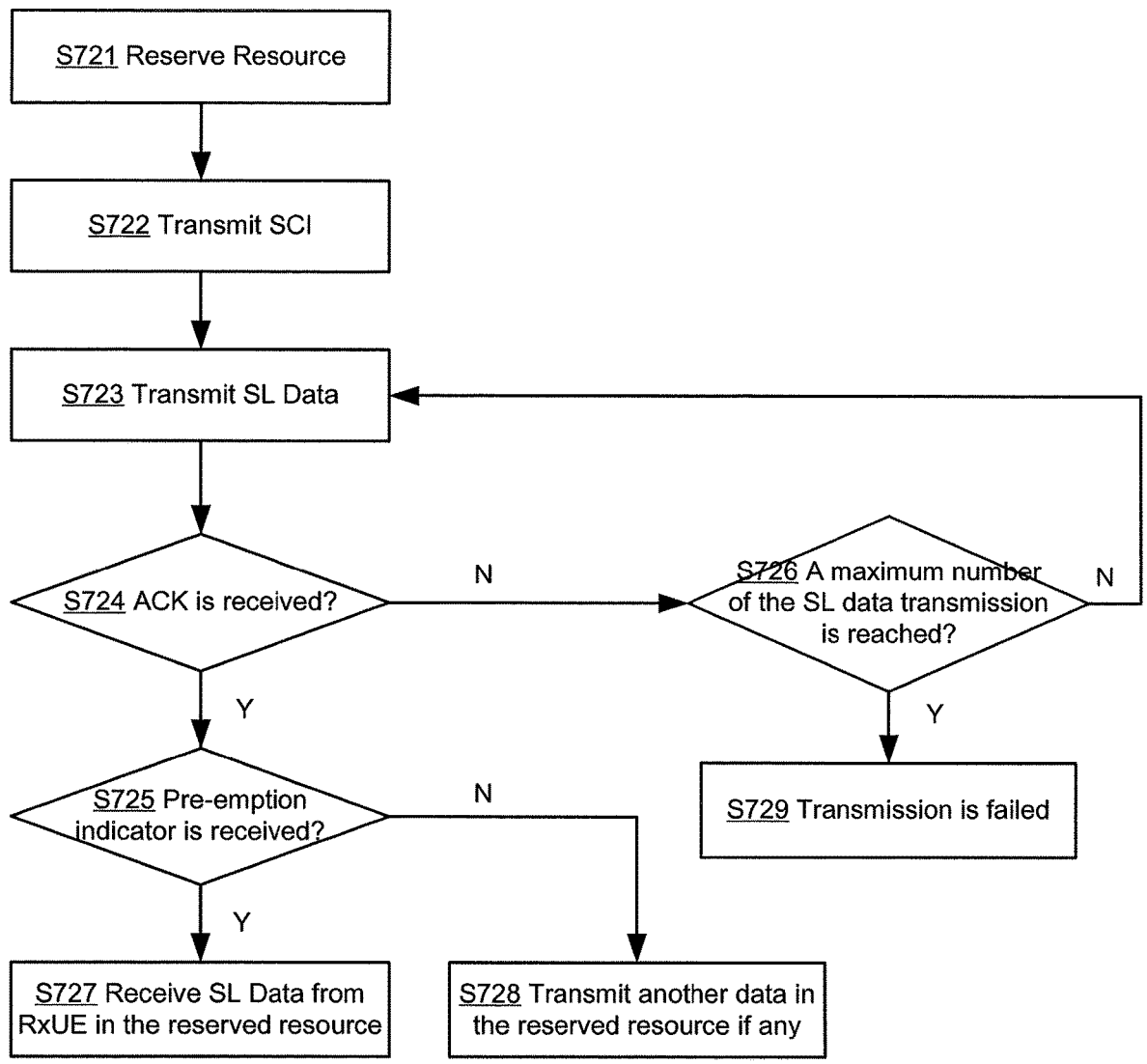
FIG. 7B is a flow diagram illustrating a method for a Tx UE under the context of FIG. 2A according to another embodiment.

FIG. 7B is a flow diagram illustrating a method for a Tx UE under the context of FIG. 2A according to another embodiment. The Rx UE is also named as the second apparatus in this embodiment. The steps other than step 726 in FIG. 7B are same with the steps other than step 706 in FIG. 7A. Therefore, only step 726 are described hereinafter.

As described for FIGS. 2A and 2B, in some embodiments, the SCI indicates the resources for the one or more SL data transmissions, wherein, the SCI indicates the resources for the one or more SL data transmission using a time offset between successive SL data transmissions and a number of the one or more SL data transmissions.

If the Tx UE doesn't receive an ACK ("N" of S724), the Tx UE determine if a maximum number of the SL data transmissions is reached. If the maximum number of the SL data transmissions has not been reached ("N" in step S726), the method proceeds to S723, in response to the SCI indicating the resources for the one or more SL data transmission. If the maximum number of the SL data transmissions has been reached ("Y" in step S726), the method proceeds to S729. In step S729, the Tx UE determines that the transmission of SL data is failed. If the Tx UE receives an ACK ("Y" in step S724), the Tx UE determines if a pre-emption indicator is received in step S725.

Figure 8A:
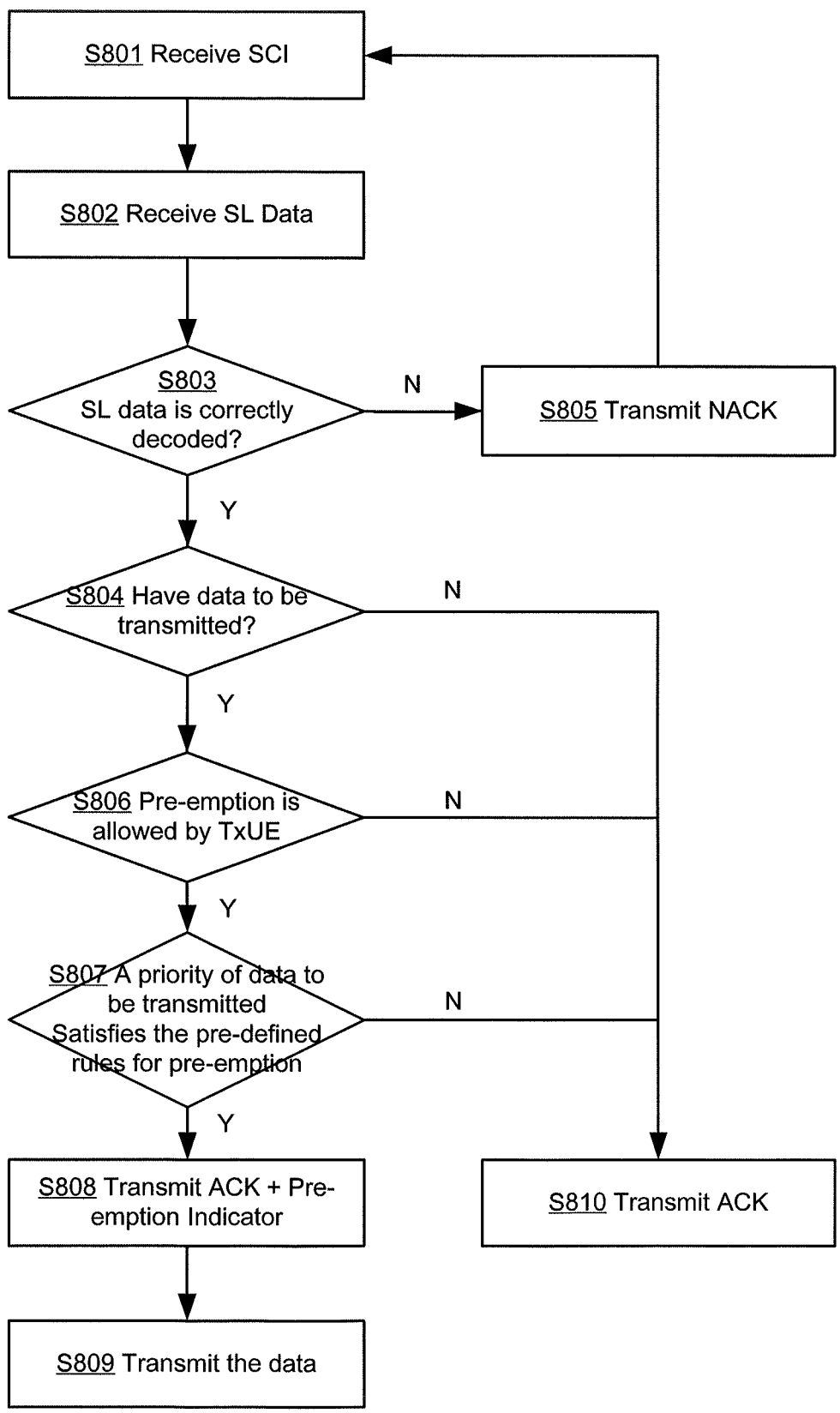
FIG. 8A is a flow diagram illustrating a method for a Rx UE under the context of FIG. 1A according to one embodiment.

FIG. 8A is a flow diagram illustrating a method for a Rx UE under the context of FIG. 1A according to one embodiment. The Tx UE is also named as the first apparatus in this embodiment.

The method begins at S801, the Rx UE receives SCI, which indicates resources for the SL data transmissions from a first apparatus such as the Tx UE, and reserves the resources for the SL data transmissions and resources for decoding result feedbacks corresponding to the SL data transmissions at S802.

In some embodiments, the Rx UE learns the resources for the SCI transmission reserved by the Tx UE.

In some embodiments, the Rx UE reserves resources for the SCI transmission, wherein the SCI indicates the resources for current SL data transmission and the resources for next SL data transmission.

In some embodiments, the reserved resources for the decoding result feedback are derived from at least one of the resources for the SL data transmissions and resources for the SCI transmissions. Alternatively, the reserved resources for the decoding result feedback are indicated in the SCI received from the first apparatus.

At S803, the Rx UE determines if the SL data is correctly decoded. If the Rx UE determines the SL data is not correctly decoded ("N" in step S803), the method proceeds to S805, in which the Rx UE transmits NACK at S805. Then the method may return to S801 in response to the SCI indicating the resources for current SL data transmission and the resources for next SL data transmission, in the case that the maximum number of SL data transmissions has not been reached from a view of Tx UE. If the Rx UE determines the SL data is correctly decoded ("Y" in step S803), the method proceeds to S804, in which the Rx UE determines if it has data to be transmitted to the Tx UE.

If the Rx UE determines it does have data to be transmitted to the Tx UE ("Y" in step S804), the method proceeds to S806, in which the Rx UE determines if the pre-emption for the reserved resources is allowed by Tx UE. If the Rx UE determines it doesn't have data to be transmitted to the Tx UE ("N" in step S804), the method proceeds to S810, in which the Rx UE transmits the decoding result feedback to the Tx UE.

If the Rx UE determines that the pre-emption for the reserved resources is allowed by Tx UE ("Y" in step S806), the method proceeds to S807, in which the Rx UE determines if the priority of data to be transmitted satisfy pre-defined rules for pre-emption. If the Rx UE determines that the priority of data to be transmitted does not satisfy pre-defined rules ("N" in step S807), or the pre-emption for the reserved resources is not allowed by the Tx UE ("N" in step S806), the method proceeds to S810, in which the Rx UE transmits the decoding result feedback to the Tx UE.

If the Rx UE determines that the priority of data satisfies the predefined rules ("Y" in step S807), the method proceeds to S808, in which the Rx UE transmits an ACK and a pre-emption indicator to the Tx UE. Then Rx UE transmits the data in step S809.

Preferably, the Rx UE transmits a pre-emption indicator in the resources for the decoding result feedback, which indicates the reserved resources for the SL data transmission from the first apparatus will be pre-empted, in the case that the decoding result feedback is a positive feedback.

Further, the Rx UE transmits a pre-emption indicator, in the case that a priority of SL data transmission to the first apparatus meets one or more followings pre-defined rules: higher than a priority of SL data transmission from the first apparatus, higher that a pre-defined priority. It should be understood by the one skilled in the relevant art that the pre-defined rules can be configured from gNB.

Optionally, the Rx UE transmits a pre-emption indicator, in the case where a pre-emption enabling indicator, which is included in the received SCI, indicates that the reserved resources for the SL data transmissions are able to be pre-empted.

In one embodiment, a field for the pre-emption indicator is included in SCI to the first apparatus. In another embodiment, a field for a flag, which indicates that a field for the decoding result feedback indicates the pre-emption indicator, is included in SCI to the first apparatus. In yet another embodiment, the pre-emption indicator is piggybacked in the resources for the decoding result feedback.

Optionally, the method further includes transmitting SCI to the first apparatus, which indicates a configuration for SL data transmissions to the first apparatus.

In some embodiments, the decoding result feedback may be transmitted, which is piggybacked in resources for SCI transmitted to another apparatus, as described in combination of FIG. 6. In other embodiments, the decoding result feedback may be transmitted, which is included in SCI transmitted to another apparatus, as described in combination of FIG. 5.

Figure 8B:
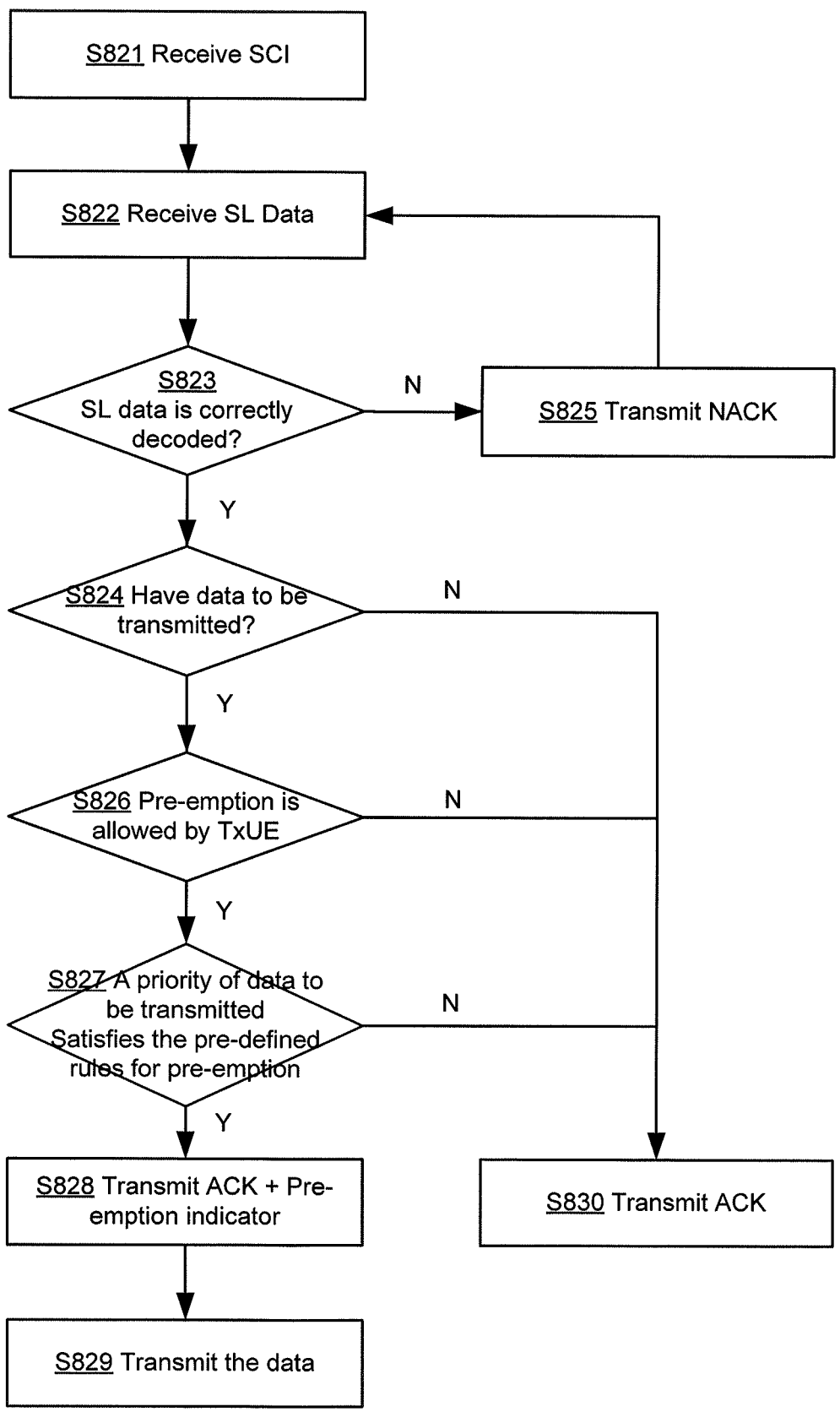
FIG. 8B is a flow diagram illustrating a method for a Rx UE under the context of FIG. 2A according to another embodiment.

FIG. 8B is a flow diagram illustrating a method for a Rx UE under the context of FIG. 2A according to another embodiment. The Tx UE is also named as the first apparatus in this embodiment. The steps other than step 825 in FIG. 8B are same with the steps other than step 805 in FIG. 8A. Therefore, only step 825 is described hereinafter.

As described for FIGS. 2A and 2B, in some embodiments, the SCI indicates the resource for one or more SL data transmissions, wherein the SCI indicates the resources for the one or more SL data transmission using a time offset between successive SL data transmissions and a maximum number of the SL data transmissions.

At S823, the Rx UE determines if the SL data is correctly decoded. If the Rx UE determines the SL data is not correctly decoded ("N" in step S823), the method proceeds to S825, in which the Rx UE transmits NACK at S825. Then the method may returns to S822 in response to the SCI indicating the resources for the one or more SL data transmissions, in the case that the maximum number of SL data transmissions has not been reached from a view of Tx UE. If the Rx UE determines the SL data is correctly decoded ("Y" in step S823), the method proceeds to S824, in which the Rx UE determines if it has data to be transmitted to the Tx UE.

Figure 9:
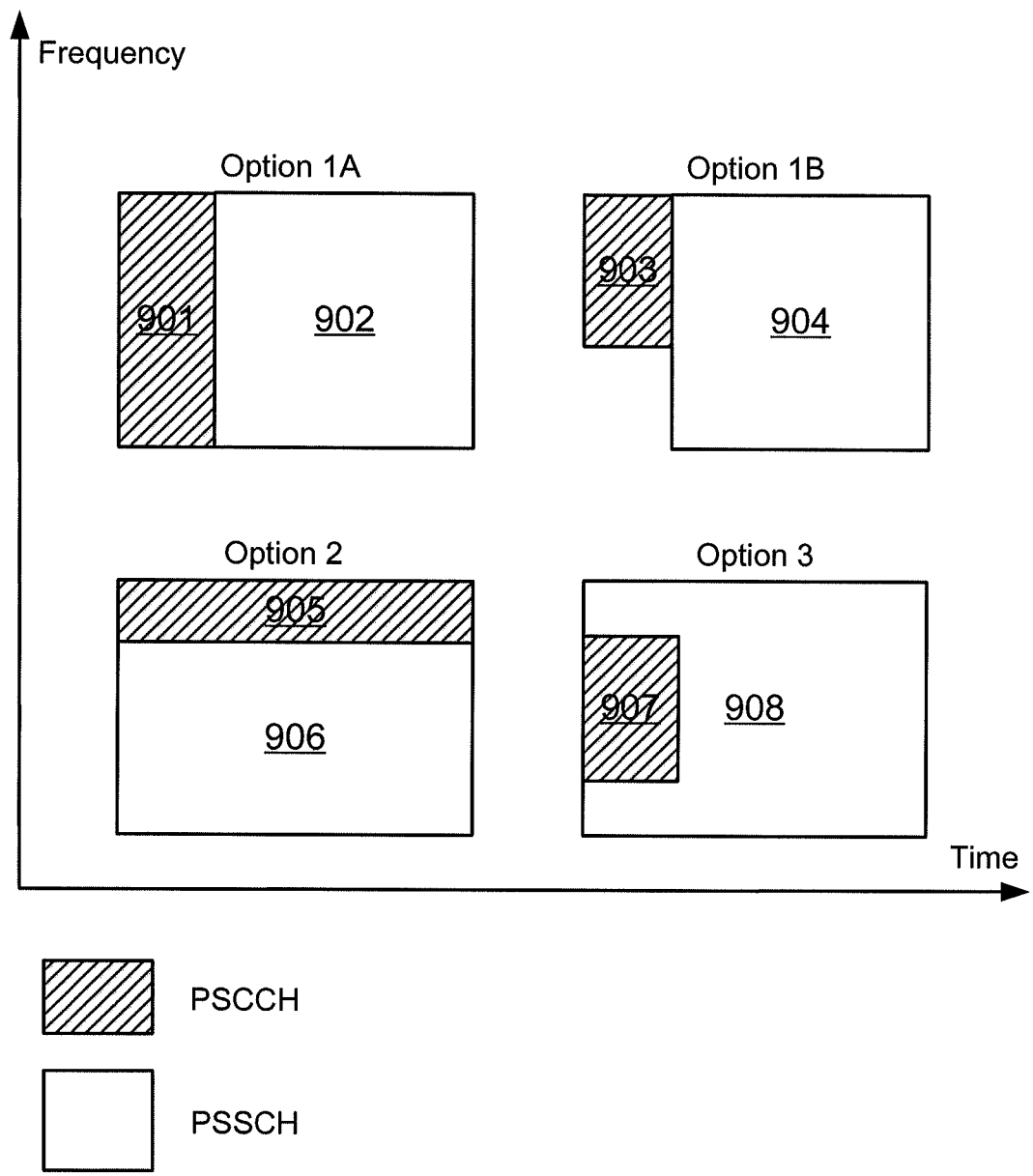
FIG. 9 is a schematic diagram illustrating exemplary association relationships between PSCCH and its associated PSSCH.

FIG. 9 is a schematic diagram illustrating exemplary association relationships between PSCCH and its associated PSSCH. Resources occupied by PSCCH are represented by the shaded blocks, while resources occupied by PSSCH are represented by the blank blocks.

Option 1 is the case that PSCCH and the associated PSSCH are transmitted using non-overlapping time resources. The Option 1 may include two cases, that is, Option 1A and Option 1B as illustrated in the FIG. 9.

Option 1A is the case that the frequency resources used by the two channels, such as PSCCH 901 and PSSCH 902, are the same.

Option 1B is the case that the frequency resources used by the two channels, such as PSCCH 903 and PSSCH 904, can be different.

Option 2 is the case that PSCCH 905 and the associated PSSCH 906 are transmitted using non-overlapping frequency resources in the all the time resources used for transmission. The time resources used by the two channels are the same.

Option 3 is the case that a part of PSCCH 907 and the associated PSSCH 908 are transmitted using overlapping time resources in non-overlapping frequency resources, but another part of the associated PSSCH and/or another part of the PSCCH are transmitted using non-overlapping time resources.

Here, the PSCCH and PSSCH can be in the same time slot and/or in different time slot.

Figure 10:
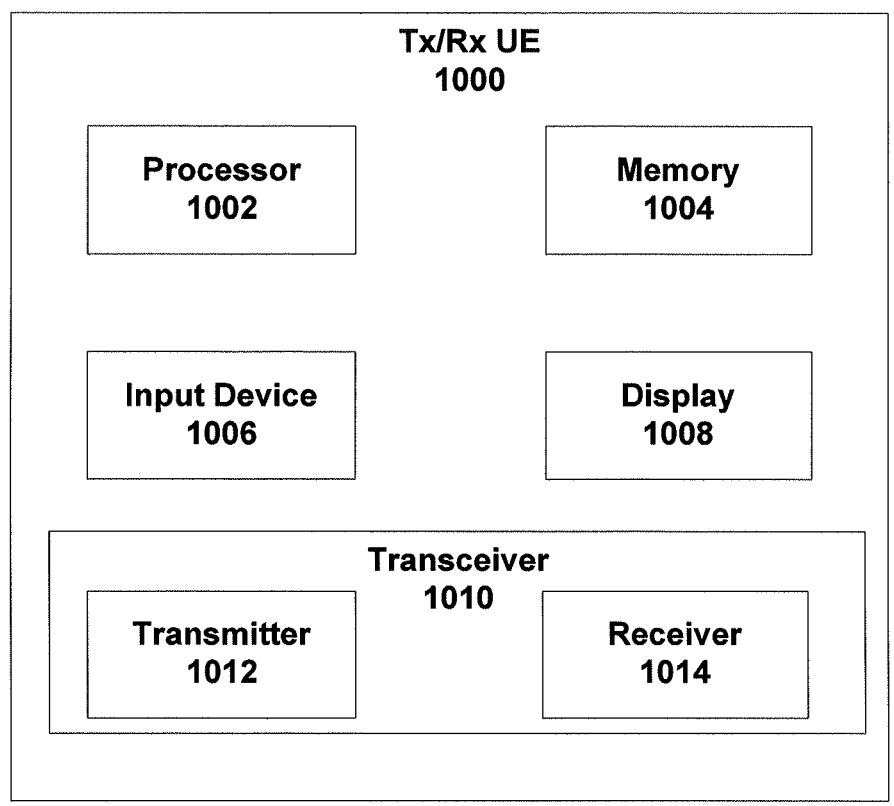
FIG. 10 is a schematic block diagram illustrating components of a Tx/Rx UE according to one embodiment.

FIG. 10 is a schematic block diagram illustrating components of a relay/remote UE according to one embodiment.

Tx/Rx UE 1000 is an embodiment of Tx/Rx UE described from FIG. 1 to FIG. 8B. Furthermore, Tx/Rx UE 1000 may include a processor 1002, a memory 1004, and a transceiver 1010. In some embodiments, Tx/Rx UE 1000 may include an input device 1006 and/or a display 1008. In certain embodiments, the input device 1006 and the display 1008 may be combined into a single device, such as a touch screen.

The processor 1002, in one embodiment, may include any known controller capable of executing computer-readable instructions and/or capable of performing logical operations. For example, the processor 1002 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1002 executes instructions stored in the memory 1004 to perform the methods and routines described herein. The processor 1002 is communicatively coupled to the memory 1004, the input device 1006, the display 1008, and the transceiver 1010.

In some embodiments, the processor 1002 controls the transceiver 1010 to transmit UL signals to Network Equipment and/or receive DL signals from Network Equipment. For example, the processor 1002 may control the transceiver 1010 to transmit CSI/RSRP as a SL channel measurement result to a network equipment such as eNB in the case that UE 1000 is a relay UE. In another example, the processor 1002 may control the transceiver 1010 to receive a higher layer signaling such as the pre-defined rules for the pre-emption of the reserved resources, as described above. In certain embodiments, the processor 1002 may monitor DL signals received via the transceiver 1010 for specific messages. For example, the processor 1002 may generate and transmit a pre-emption indicator to the Tx UE.

The memory 1004, in one embodiment, is a computer-readable storage medium. In some embodiments, the memory 1004 includes volatile computer storage media. For example, the memory 1004 may include RAM, including dynamic RAM ("DRAM"), synchronous dynamic RAM ("SDRAM"), and/or static RAM ("SRAM"). In some embodiments, the memory 1004 includes non-volatile computer storage media. For example, the memory 1004 may include a hard disk drive, flash memory, or any other suitable non-volatile computer storage device. In some embodiments, the memory 1004 includes both volatile and non-volatile computer storage media. In some embodiments, the memory 1004 stores data relating to the pre-emption indicator received from the Rx UE. In some embodiments, the memory 1004 also stores program code and related data, such as an operating system or other controller algorithms operating on Tx/Rx UE 1000.

Tx/Rx UE 1000 may optionally include an input device 1006. The input device 1006, in one embodiment, may include any known computer input device including a touch panel, a button, a keyboard, a stylus, a microphone, or the like. In some embodiments, the input device 1006 may be integrated with the display 1008, for example, as a touch screen or similar touch-sensitive display. In some embodiments, the input device 1006 includes a touch screen such that text may be inputted using a virtual keyboard displayed on the touch screen and/or by handwriting on the touch screen. In some embodiments, the input device 1006 includes two or more different devices, such as a keyboard and a touch panel. In certain embodiments, the input device 1006 may include one or more sensors for monitoring an environment of Tx/Rx UE 1000.

Tx/Rx UE 1000 may optionally include a display 1008. The display 1008, in one embodiment, may include any known electronically controllable display or display device. The display 1008 may be designed to output visual, audible, and/or haptic signals. In some embodiments, the display 1008 includes an electronic display capable of outputting visual data to a user. For example, the display 1008 may include, but is not limited to being, an LCD display, an LED display, an OLED display, a projector, or a similar display device capable of outputting images, text, or the like, to a user. As another non-limiting example, the display 1008 may include a wearable display such as a smart watch, smart glasses, a heads-up display, or the like. Further, the display 1008 may be a component of a smart phone, a personal digital assistant, a television, a table computer, a notebook (laptop) computer, a personal computer, a vehicle dashboard, or the like.

In certain embodiments, the display 1008 may include one or more speakers for producing sound. For example, the display 1008 may produce an audible alert or notification (e.g., a beep or chime). In some embodiments, the display 1008 includes one or more haptic devices for producing vibrations, motion, or other haptic feedback. In some embodiments, all or portions of the display 1008 may be integrated with the input device 1006. For example, the input device 1006 and display 1008 may form a touch screen or similar touch-sensitive display. In other embodiments, the display 1008 may be located near the input device 1006.

The transceiver 1010, in one embodiment, is configured to communicate wirelessly with the network equipment such eNB. In certain embodiments, the transceiver 1010 comprises a transmitter 1012 and a receiver 1014. The transmitter 1012 is used to transmit UL communication signals to the network equipment and the receiver 1014 is used to receive DL communication signals from the network equipment. For example, the transmitter 1012 may transmit SCI including SA for the SL data transmission. As another example, the receiver 1014 may receive the pre-emption indicator for pre-empting the reserved resources.

The transmitter 1012 and the receiver 1014 may be any suitable type of transmitter or receiver, respectively. Although only one transmitter 1012 and one receiver 1014 are illustrated, the transceiver 1010 may have any suitable number of transmitters 1012 and receivers 1014. For example, in some embodiments, Tx/Rx UE 1000 includes a plurality of transmitter 1012 and receiver 1014 pairs for communicating on a plurality of wireless networks and/or radio frequency bands, each transmitter 1012 and receiver 1014 pair configured to communicate on a different wireless network and/or radio frequency band than the other transmitter 1012 and receiver 1014 pairs.

Embodiments may be practiced in other specific forms. The described embodiments are to be considered in all respects only as illustrative and not as restrictive. The scope of the invention is, therefore, indicated by the appended claims rather than by the foregoing description. All changes which fall within the meaning and range of equivalency of the claims are to be embraced within their scope.

The invention claimed is:

1. An apparatus, comprising:
   at least one memory; and
   at least one processor coupled with the at least one memory and configured to cause the apparatus to:
   reserve resources for one or more sidelink data transmissions and resources for decoding result feedbacks corresponding to the one or more sidelink data transmissions;

transmit sidelink control information to a second apparatus, which indicates the resources for the one or more sidelink data transmissions; and receive the decoding result feedback and a pre-emption indicator.

2. The apparatus of claim 1, wherein the at least one processor is further configured to cause the apparatus to:

reserve resources for the sidelink control information transmission; and the sidelink control information indicates the resources for current sidelink data transmission and the resources for next sidelink data transmission.

3. The apparatus of claim 1, wherein the sidelink control information indicates the resources for the one or more sidelink data transmissions.

4. The apparatus of claim 3, wherein the sidelink control information indicates the resources for the one or more sidelink data transmission using a time offset between successive sidelink data transmissions and a maximum number of the one or more sidelink data transmissions.

5. The apparatus of claim 1, wherein the resources for the decoding result feedback are derived from at least one of the resources for the sidelink data transmissions and resources for the sidelink control information transmission.

6. The apparatus of claim 1, wherein the resources for the decoding result feedback are indicated in the sidelink control information transmitted to the second apparatus.

7. The apparatus of claim 1, wherein the at least one processor is further configured to cause the apparatus to:

transmit, to the second apparatus, an indicator of a quality of service level of sidelink data transmission in the sidelink control information.

8. The apparatus of claim 1, wherein the at least one processor is further configured to cause the apparatus to:

receive the pre-emption indicator in the resources for the decoding result feedback, which indicates a second apparatus will pre-empt the reserved resources for the sidelink data transmission if the decoding result feedback is a positive feedback.

9. The apparatus of claim 8, wherein a field for the pre-emption indicator is included in sidelink control information from the second apparatus.

10. The apparatus of claim 8, wherein a field for a flag, which indicates that a field for the decoding result feedback represents the pre-emption indicator, is included in sidelink control information from the second apparatus.

11. The apparatus of claim 8, wherein the pre-emption indicator is piggybacked in the resources for the decoding result feedback.

12. The apparatus of claim 8, wherein the at least one processor is further configured to cause the apparatus to:

receive sidelink data transmission from the second apparatus, a configuration for decoding a sidelink data transmission from the second apparatus is indicated by sidelink control information from the second apparatus or the sidelink control information transmitted to the second apparatus.

13. The apparatus of claim 1, wherein the sidelink control information transmitted to the second apparatus includes a pre-emption enabling indicator, which indicates whether the reserved resources for the sidelink data transmission are able to be pre-empted.

14. The apparatus of claim 1, wherein the at least one processor is further configured to cause the apparatus:

receive the decoding result feedback, which is piggybacked in resources for sidelink control information transmitted from the second apparatus to another apparatus.

15. The apparatus of claim 1, wherein the at least one processor is further configured to cause the apparatus to:

receive the decoding result feedback, which is included in sidelink control information transmitted from the second apparatus to another apparatus.

16. A user equipment (UE), comprising:

at least one memory; and at least one processor coupled with the at least one memory and configured to cause the UE to:

receive sidelink control information, which indicates resources for sidelink data transmissions from a first apparatus; and transmit decoding result feedback and a pre-emption indicator.

17. The UE of claim 16, wherein:

the sidelink control information indicates the resources for a current sidelink data transmission and the resources for a next sidelink data transmission.

18. The UE of claim 16, wherein:

the sidelink control information indicates the resource for one or more sidelink data transmissions.

19. A processor for wireless communication, comprising:

at least one controller coupled with at least one memory and configured to cause the processor to:

receive sidelink control information, which indicates resources for sidelink data transmissions from a first apparatus; and transmit decoding result feedback and a pre-emption indicator.

20. A method performed by a user equipment (UE), the method comprising:

receiving sidelink control information, which indicates resources for sidelink data transmissions from a first apparatus; and transmitting decoding result feedback and a pre-emption indicator.

* * * * *